United States Patent [19]

Lofland et al.

[11] 4,307,488
[45] Dec. 29, 1981

[54] COMBINED STRAND COMPRESSER AND DOFFER AND END DRESSER

[75] Inventors: William Lofland, Renton, Wash.; Alfred D. Story; Harold H. Martinek, both of Danville, Ill.

[73] Assignee: Teepak, Inc., Chicago, Ill.

[21] Appl. No.: 147,770

[22] Filed: May 8, 1980

[51] Int. Cl.³ .................................................. A22C 13/02
[52] U.S. Cl. ..................................................... 17/42
[58] Field of Search ................................ 17/41, 42, 49

[56] References Cited

U.S. PATENT DOCUMENTS

| | | | |
|---|---|---|---|
| 3,112,516 | 12/1963 | Bonnee | 17/42 |
| 3,209,398 | 10/1965 | Ziolko | 17/42 |
| 3,454,981 | 7/1969 | Martinek | 17/42 |
| 3,597,791 | 8/1971 | Marbach et al. | 17/42 X |
| 3,942,221 | 3/1976 | Sipusic et al. | 17/42 |

Primary Examiner—Willie G. Abercrombie
Attorney, Agent, or Firm—Charles E. Brown

[57] ABSTRACT

This relates to an apparatus for treating a separated strand of shirred casing. The strand is fed along a mandrel and a stop member is positioned transversely of the mandrel adjacent a free end thereof, after which the trailing end of the strand is engaged by a shaping device which, as it advances toward the stop to compress the strand, is oscillated or rotated also to dress the trailing end of the strand. When the stop is opened, the same member is used to doff the strand from the mandrel.

11 Claims, 10 Drawing Figures

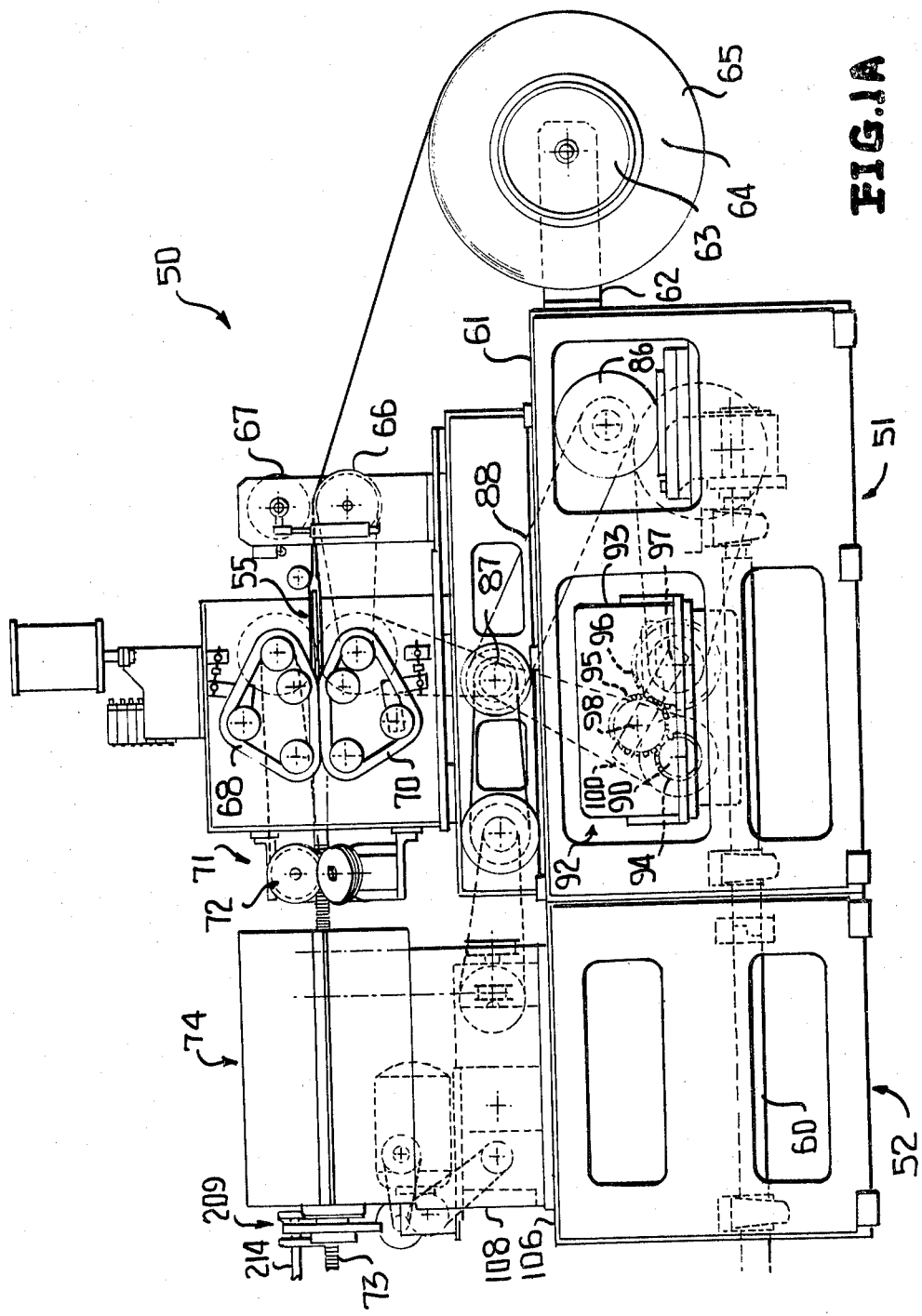

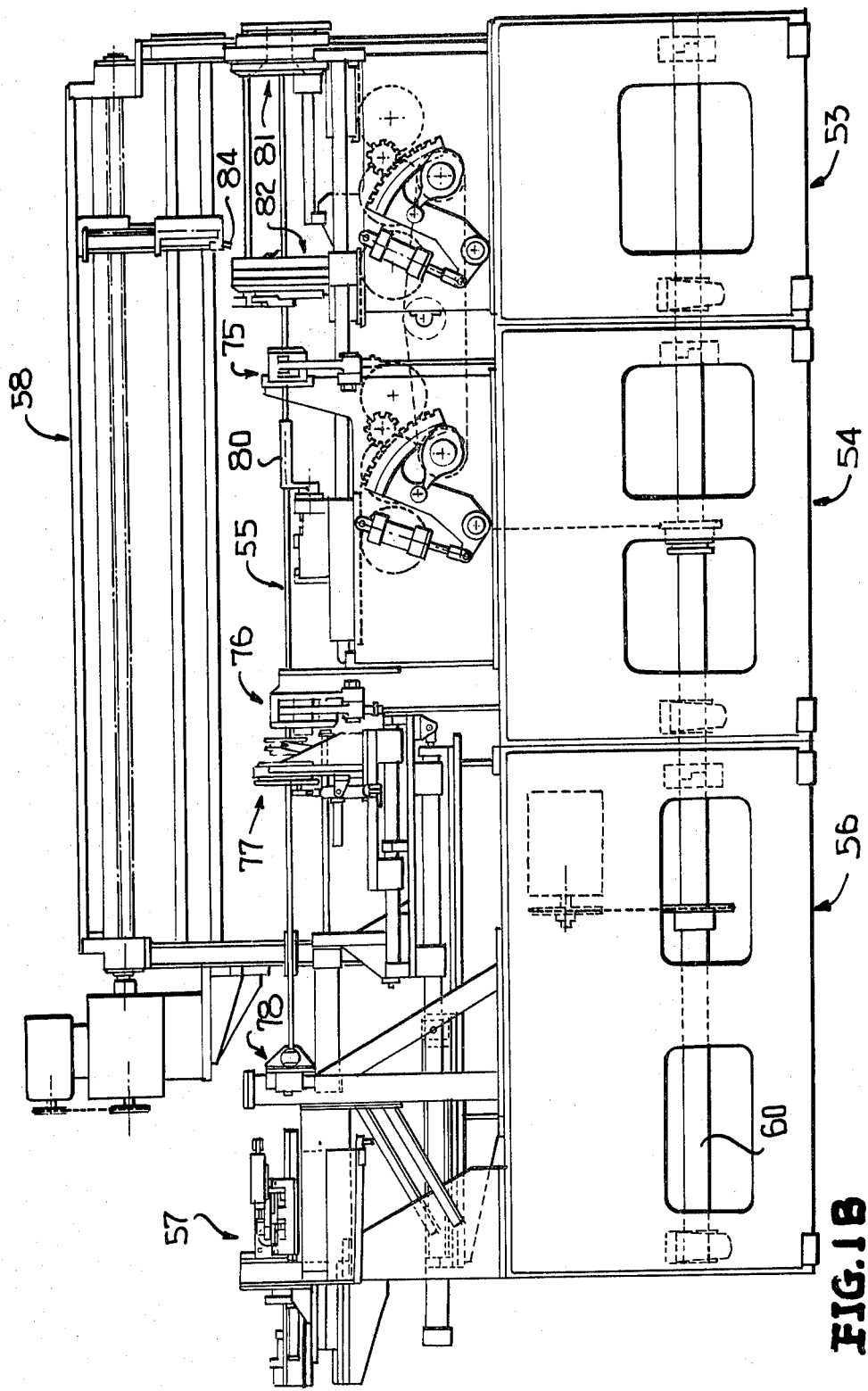

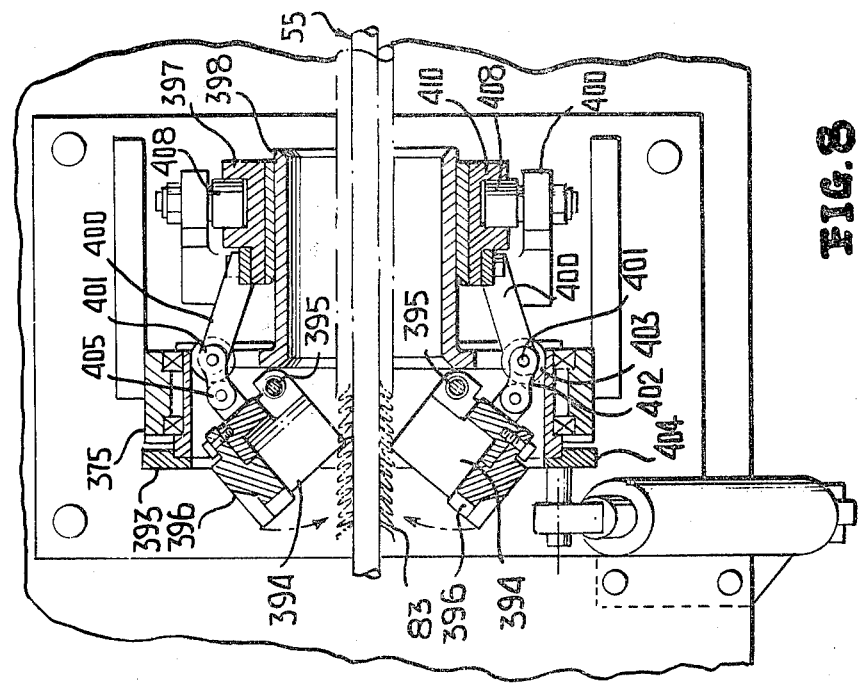
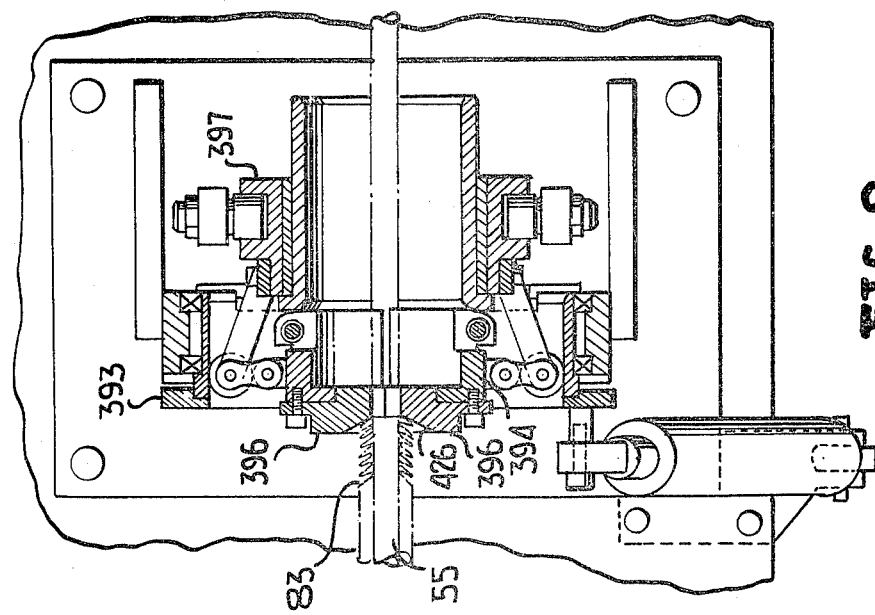

COMBINED STRAND COMPRESSER AND DOFFER AND END DRESSER

This invention relates in general to a part of a shirring machine wherein a shirred strand is drawn from a continuous shirred casing and then is compressed and doffed.

In accordance with this invention, a separated strand of a shirred casing is moved along a mandrel to a position adjacent an end stop, after which the strand is engaged by a face member which engages the trailing end of the strand to push it against the stop and which face member is simultaneously oscillated or rotated so as to dress the trailing end of the strand while compressing the same.

The same device, after the compressing has been completed and the top member opened, is utilized to doff the strand.

With the above and other objects in view that will hereinafter appear, the nature of the invention will be more clearly understood by reference to the following detailed description, the appended claims, and the several views illustrated in the accompanying drawings.

IN THE DRAWINGS

FIGS. 1A and 1B are side elevational views of the continuous casing shirring machine showing the general details thereof.

FIG. 8 is a schematic horizontal sectional view taken through the head of the combined strand compresser and doffer along the line 8—8 of FIG. 7, and shows the open position thereof to permit the passage of a shirred casing strand therethrough.

FIG. 9 is a view similar to FIG. 8 showing the strand having passed through the head and the head closed and in engagement with the strand.

Figure 2:
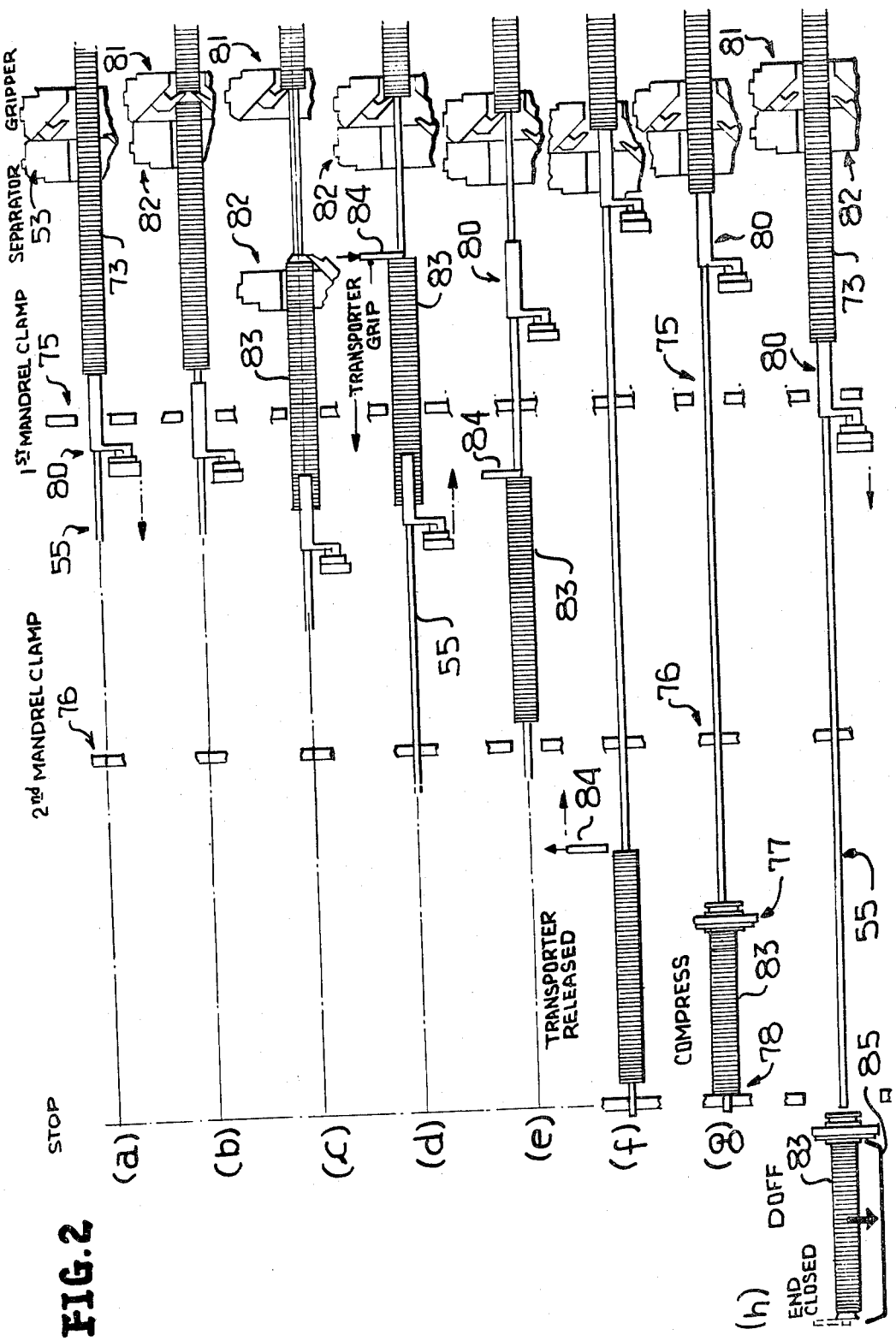
FIG. 2 is a schematic view showing the sequence of operations of the machine.

Referring now to the drawings in detail, reference is first made to FIGS. 1A and 1B wherein the general details of the continuous casing shirring and spinning machine are illustrated, the machine being generally identified by the numeral 50. The machine is formed of a plurality of replaceable units which include a casing feed and shirring unit 51 located at the head of the machine. Next, there is a combined shirred casing hold back and density control unit 52. This is followed by a casing separator unit 53 which receives the density controlled shirred casing and separates it into individual strands of regulated lengths. When desired, there is next an auxiliary hold back unit 54 which also carries clamp type supports for the mandrel in a manner to be described in detail hereinafter, the mandrel being generally identified by the numeral 55.

The next unit is a casing compresser and doffer unit generally identified by the numeral 56. This unit has associated therewith a combined strand handler and end closer unit 57.

Bridging generally between the units 53 and 56 is a transport device 58 for transporting a separated shirred casing strand from the casing separator device 53 into the combined casing compresser and doffer device 56.

All of the units are driven in timed relation under the control of a main drive shaft 60 which extends the length of the machine.

Referring specifically to FIG. 1A, it is to be understood that basically the unit 51 is conventional and forms no part of this invention. The unit 51 includes a mounting base 61 which has extending forwardly from the front end thereof a support 62 for a reel holder 63 which, in turn, is adapted to have received thereon a reel 64 of flat casing. The casing, 65, is in the form of a tubular film of collagen or cellulose which are extensively used as a sausage casing. The film is initially formed as a continuous tube and is rolled flat. The flat film is fed through a nip defined by a metering roll 66 and a back-up roll 67 onto the forward end of the mandrel 55 wherein it is automatically opened and is internally pressurized by a combined air spray and lubricant or softening fluid spray.

The opened casing 65 is then fed along the mandrel 55 at a controlled rate by a pair of opposed drive belts 68, 70 in a conventional manner. The casing 65 next passes through a shirring head 71 which includes a plurality of conventional shirring wheels 72 which radially inwardly fold or shirr the casing so that many feet of the casing may be compressed into a relatively short space. For example, eighty feet of the casing may eventually be compressed into a stick or strand having a length on the order of thirteen inches.

The shirred casing, identified by the numeral 73, then passes into a combined casing hold back and density control device 74 which is part of the density control unit 52. The device 74 receives the shirred casing and permits the shirred casing to be advanced at the same rate as it is shirred by the shirring head 71. The device 74 is also mounted for rotation about the axis of the mandrel so as to impart a spin to the shirred casing 73 as desired. The density control device 74 may be selectively rotated in opposite directions either continuously or alternately so as either continuously to spin the casing in a selected direction or first to spin the casing in one direction and then in the opposite direction so as effectively to cancel the spin in the overall length of the casing.

Referring now to FIG. 1B, the density controlled shirred casing is directed to the unit 53 which at timed intervals is operated to grip an intermediate portion of the shirred casing with one set of fingers holding back the casing and the other advancing the casing to tear off or segregate a leading portion of the casing into individual sticks or strands of controlled length.

At this time it is pointed out that while the mandrel 55 is generally supported at spaced intervals along its length by various components of the machine 50, there are two sets of mandrel support clamp assemblies 75 and 76. The mandrel support clamp assemblies 75 and 76 serve to introduce into the mandrel 55 in a known manner separate streams of air and lubricating or casing softening liquids. One of the support clamp assemblies 75 and 76 remains closed at all times and is separately openable to permit a separated casing strand to be advanced along the mandrel 55 to the device 56 for first compressing the strand and then doffing the strand from the tail end of the mandrel.

The auxiliary hold back device 54, when utilized, engages the advancing end of the shirred casing 73 and cooperates with the combined casing hold back and separator device 53 to maintain the density of the shirred casing.

When a casing strand is separated, it is engaged by the transporter 58 and transported first to an intermediate position between the mandrel support clamps 75, 76 and then through the mandrel support clamp 76 and a head of the shirred casing compresser and doffer unit 56 for an operation thereon by the device 56.

The combined casing compresser and doffer unit 56 includes a travelling head 77 which, in association with an openable stop assembly 78 first functions to compress a casing strand and then to doff the casing strand from the mandrel 55 and deliver it to the strand holder and closer unit 57.

Reference is now made to the schematic showing of FIG. 2. It will be seen that with the mandrel support clamp 75 open and the mandrel support clamp 76 closed, the shirred casing 73 is advanced through the combined casing hold back and separator device 53 and a preselected length of the shirred casing has passed through the device 53. At this time, when the auxiliary hold back device 54 is used, a hold back head 80 of the auxiliary hold back device 54 will generally surround the mandrel 55 and permit the leading end of the shirred strand 73 to be advanced at the same rate as it is permitted to be advanced by the density control device 52.

At a controlled time, the head 80 will open and also begin rapidly to retract. At the same time the shirred casing will be gripped and held back by a hold back unit 81 of the device 53 while in the same plane as the unit 81 the shirred casing is also engaged by a separator unit 82 of the device 53. For a short period of time the units 81, 82 will be moved in unison, after which the unit 82 will be rapidly advanced as shown in FIG. 3c to pull apart an intermediate portion of the shirred casing 73 and to be able to separate from the continuously shirred casing a strand or stick 83. The separator unit then returns to its position adjacent the hold back unit 81, leaving the separated strand 83 advanced on the mandrel 55. The mandrel 55 is then loosely engaged by a pusher element 84 of the transporter 58 and the separated strand 83 moved to the position intermediate the mandrel support clamps 75, 76 as shown in FIG. 3e. At this time the support clamp assembly 75 closes, followed by the opening of the support clamp assembly 76 so that the casing strand 83 may again be transported along the mandrel 55.

Following the separation of the strand 83, it will be seen that the hold back unit 81 continues to engage the leading end of the shirred casing and cooperates with the density control device 74 to maintain the controlled density of the shirred casing.

The auxiliary hold back device, when utilized, next advances the head 80 thereof to engage the leading end of the shirred casing and the hold back unit 81 releases the leading end of the shirred casing so that the shirred casing may now pass through both the hold back unit 81 and the separator unit 82 under the control of the auxiliary hold back unit 54.

In the meantime, the casing strand 83 is being operated on by the combined casing compresser and doffer unit 56. The stop 78 is closed and the head 77 engages the trailing end of the separated casing strand 83 and serves to compress the strand to the desired length. For example, the strand of controlled density may have had a length on the order of twenty-five inches when initially separated from the following shirred strand portion and is compressed to a length on the order of nineteen inches.

If desired, while the strand is being compressed, the head 77 may be oscillated or rotated about the mandrel 55 to shape the trailing end of the strand 83 to repair any minor deformation which may have occurred during the separation of the strand.

The stop 78 is then opened and the head 77 is further moved along the mandrel to doff the compressed strand 83 from the mandrel 55. The doffed strand is then received by a strand handler and closer 57 which laterally shifts the compressed strand into alignment with an end closer which is conventional, and thereafter deposit the closed strand in a receiving tray 85.

It is to be understood that the machine 50 is adjustable to receive tubular films of different diameters and different materials. Further, it is to be understood that the machine 50 is intended to supply strands of different lengths containing different footage of casing. Accordingly, it is necessary that the drive for the machine be adjustable. With reference to FIG. 1A, it will be seen that the machine 50 includes a primary drive motor 86 which drives a shaft 87 by means of a drive chain or belt 88. There is driven from the shaft 87, among other components, the shaft 60. In order to accomplish this, there is a shaft 90 which is driven from the shaft 87 by means of a drive belt or chain 91 and the shaft 90 constitutes the input for a quick change gear unit generally identified by the numeral 92. The quick change gear unit 92 includes a readily openable housing 93 into which the shaft 90 extends. The shaft carries a gear 94 with which there is meshed an intermediate gear 95 which, in turn, is meshed with a gear 96 carried by an output shaft 97. The intermediate gear 95 is carried by a shaft 98 which, in turn, is adjustable on a support 100.

The gear 94 is replaceable to change the drive ratio between the shaft 90 and the shaft 97 and the shaft 98 is shifted in accordance with the selected gear diameter so that the gear 95 will mesh with the new gear 94.

Reference is now made to FIGS. 3-9 wherein the details of the strand compresser and doffer 56 are illustrated. The strand compresser and doffer 56 is mounted on a machine base 374 adjacent to and in alignment with the machine base 311 and as previously briefly described includes a movable head 77 and an openable stop 78.

The head 77 includes a support member 375 which is rigidly mounted on a carriage 376 which is provided with slides 377 mounted on guide rods 378. The guide rods 378 are, in turn, carried by a carriage 380 which includes slides 381 mounted on guide rods 382 which are fixedly mounted on a supporting base 383.

The carriage 380 is provided with an upstanding support 384 which carries an extensible motor 385 in the form of a fluid cylinder having a piston rod 386 which is cooperable at one end with the support 375 to draw the carriage 376 along the guide rods 378.

The base 383 carries a second extensible motor 387 in the form of a fluid cylinder having an elongated piston rod 388 which is coupled to the support 375 of the carriage 280 for moving the carriage 380 along the guide rods 382.

Figure 7:
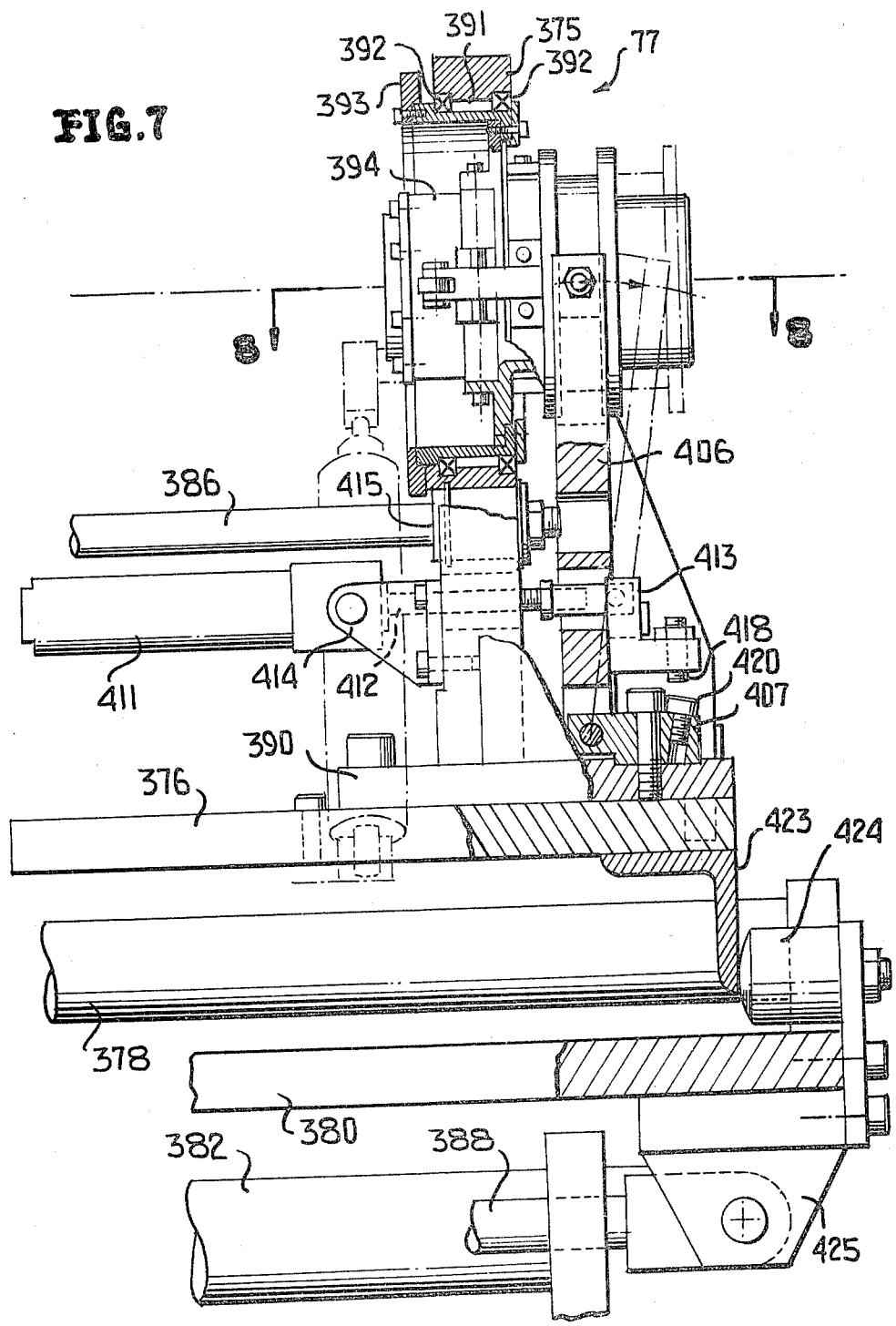
FIG. 7 is an enlarged fragmentary longitudinal sectional view taken generally along the line 7—7 of FIG. 6.

Referring now to FIG. 7 in detail, it will be seen that the support 375 has a mounting base 390 which is fixedly secured to the carriage 376. The support 375 is in the form of a block having an enlarged opening 391 therethrough generally centered on the axis of the mandrel and having rotatably journalled therein by way of bearings 392 an oscillating head 393. The oscillating head 393, as is best shown in FIG. 8, has pivotally mounted thereon a pair of jaws 394. Each jaw 394 is pivotally mounted on the rotating head 393 by means of pivot shafts 395 for swinging movement between open and closed positions, as is best shown in FIGS. 8 and 9. Further, each jaw 394 carries a face plate half 396 for engaging a shirred casing strand 83 in a manner to be described hereinafter.

In order that the jaws 394 may be pivoted between open and closed positions, there is a collar 397 which is slidably mounted on a reduced diameter tubular extension 398 of the rotating head 393. The collar 397 has carried thereby arms 400 which are provided at their remote ends with pivot shafts 401 which both pivotally connect the arms 400 to links 402 and carry rollers 403 which run along trackways 404. The links 402 are in turn pivotally connected to the jaws 394 by pivot pins 405.

As will be readily apparent by a comparison of FIGS. 8 and 9, when the collar 397 is in its righthand position of FIG. 8 the jaws 394 are open, and when the collar 397 is moved to its lefthand position of FIG. 9, the arms 400 move the links 402 causing the links to cam the jaws 394 together.

As is best shown in FIG. 7, there is a yoke 406 which is disposed to the right of the support 375 and is pivotally mounted on a bracket 407 carried by the base 390. The yoke carries a pair of cam followers 408 which are disposed in a circular track 410 which extends about the collar 297. Thus, as is apparent from FIG. 7, when the yoke 406 is in upright position the jaws 394 are closed, and when it is tilted to the right the jaws are open.

The jaws 394 are opened and closed by pivoting the yoke 406 by means of an extensible fluid actuator 411 which is illustrated as a fluid cylinder and which has a piston rod 412 connected to a bracket 413 which, in turn, is carried by the yoke 406. The cylinder 411 is carried on the support 375 by way of a suitable bracket 414.

At this time it is pointed out that the bracket 413 and the bracket 407 carry cooperating adjustable stop elements 418 and 420 for limiting the opening movement of the jaws 394 by the cylinder 411.

A stop member 423 carried by the carriage 376 is engageable with a buffer 424 carried by the carriage 380 to restrict the stopping shock imparted to the head 77 upon its return.

As is shown in FIG. 7, the piston rod 388 is coupled to a depending bracket 425 at the right end of the carriage 380.

Referring now to FIG. 8, it will be seen that when the jaws 394 are in their closed position, the face plate halves 396 are closely spaced around the mandrel 55 and abut the end of the shirred casing strand 83 which is to be compressed. It is also to be noted that the face plate halves 396 combine to define a frustoconical surface 426 which engages the trailing end of the casing strand 83. This surface is a smooth surface and is suitable for reforming the casing strand end which was torn during the separation of the strand from the continuously shirred casing 73.

Figure 6:
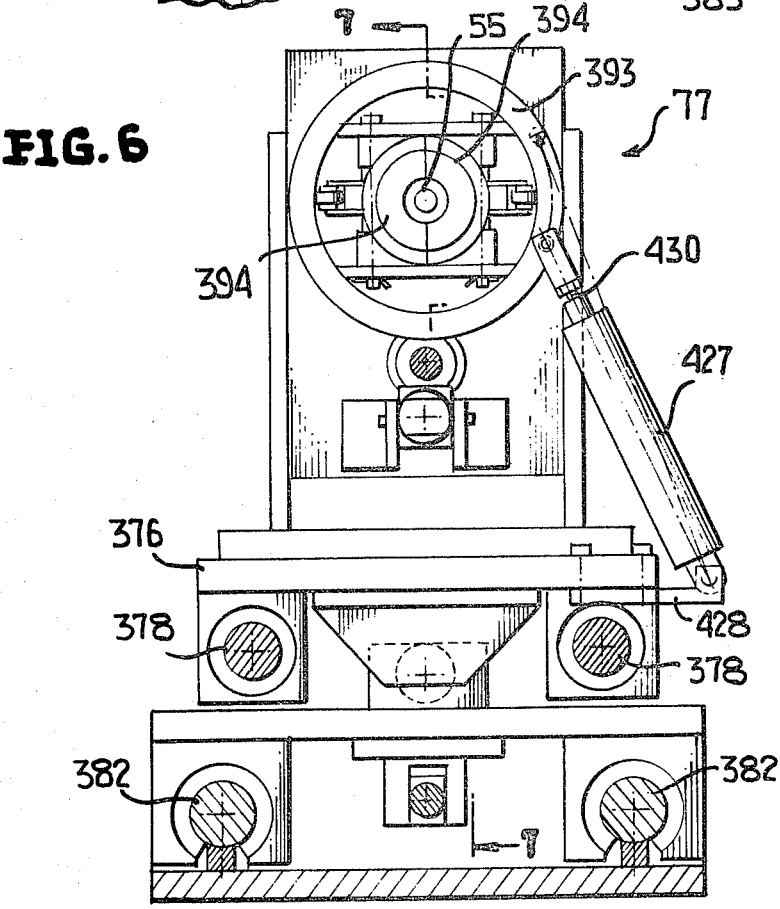
FIG. 6 is a transverse vertical sectional view taken generally along the line 6—6 of FIG. 3, and shows the specific mounting of the strand engaging head of the strand compresser and doffer.

In order to smooth the trailing end of the casing strand 83, it is desirable to effect rotation of the frustoconical surface 426 relative to the casing strand. It is for this reason that the rotating head 393 is oscillated by means of an extensible drive member 427 in the form of a fluid cylinder which has one end thereof anchored relative to the carriage 376 by means of a bracket 428 and has the piston rod 430 thereof coupled to the rotatable head 393. This is best shown in FIG. 6. If desired, the rotatable head 393, as opposed to being oscillated, could be rotated by a suitable small motor (not shown) drivingly connected to the rotatable head 393.

Figure 3:
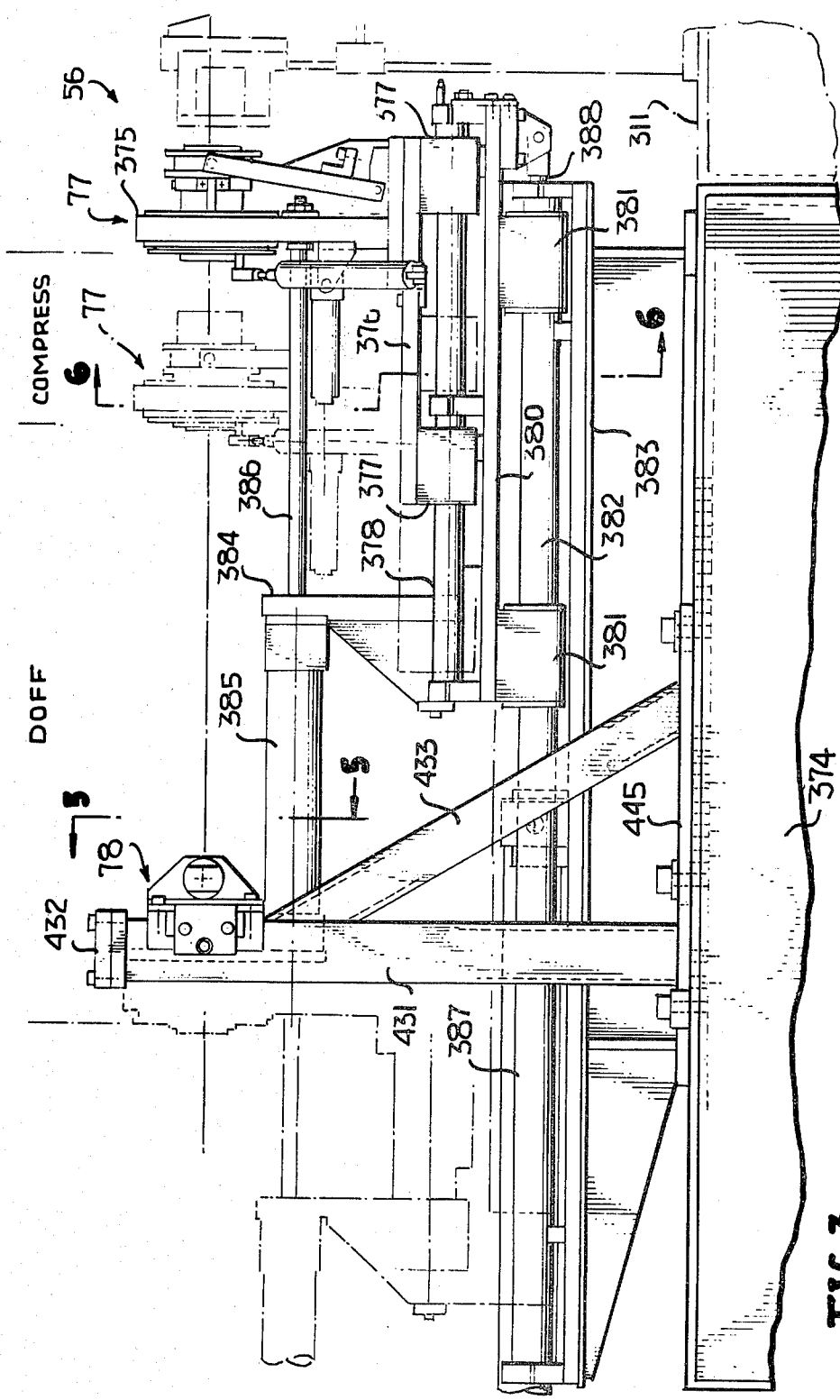
FIG. 3 is an enlarged side elevational view of a combination strand compresser and doffer, and shows the several positions thereof.
Figure 4:
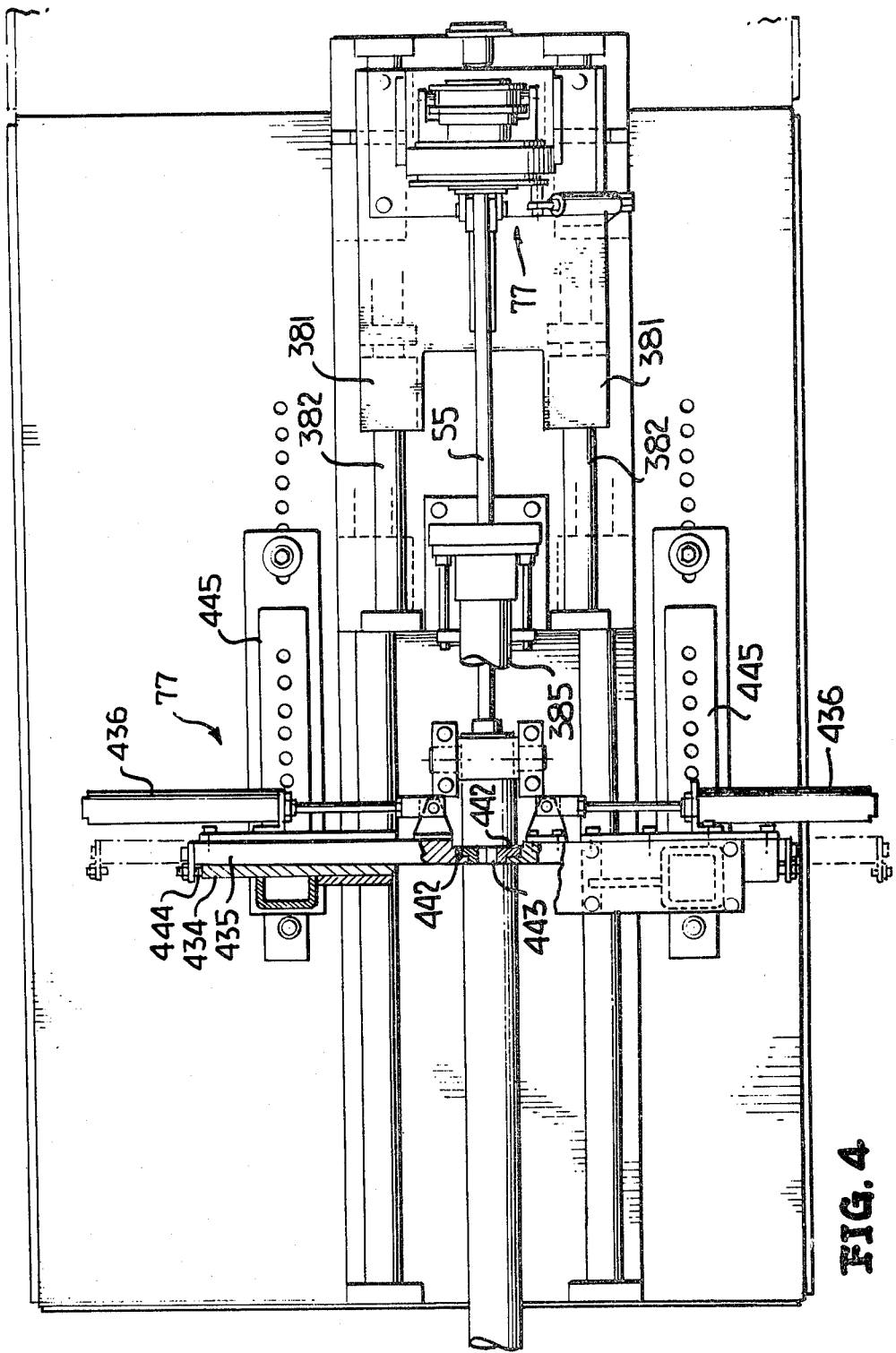
FIG. 4 is a plan view of the strand compresser and doffer of FIG. 3.
Figure 5:
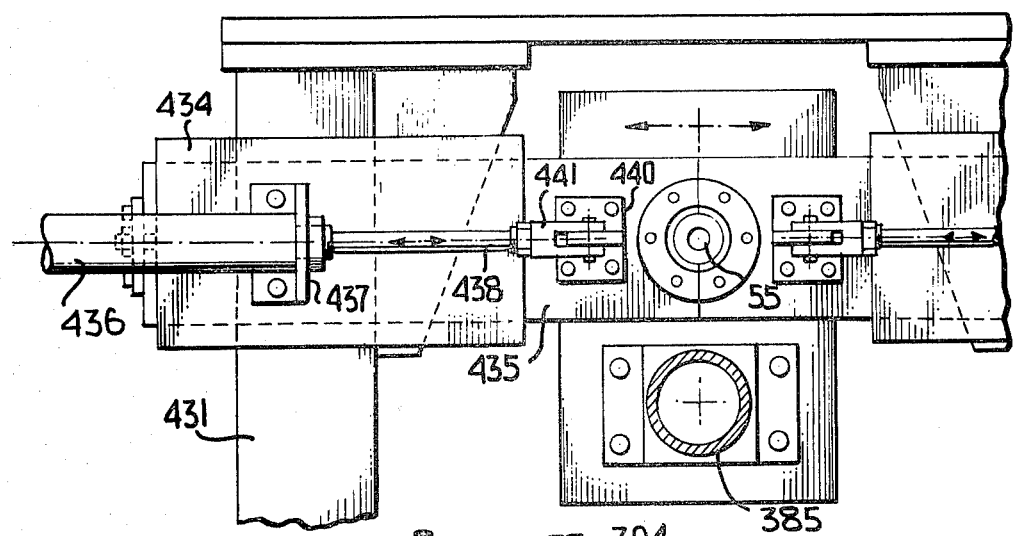
FIG. 5 is an enlarged fragmentary transverse sectional view taken generally along the line 5—5 of FIG. 3, and shows the details of a strand stop mechanism.

Reference is now made to FIGS. 3–5 wherein the details of the stop unit 78 are best shown. First of all, the base 374 has extending upwardly therefrom two supports 431 which are coupled at their upper ends by a tie plate 432 and which are braced by braces 433. Each support 431 carries a guide structure 434 in which there is mounted a slide 435 for transverse movement. Each slide has coupled thereto an extensible drive member 436 in the form of a fluid cylinder which is carried by a bracket 437 mounted on the guide 434. A piston rod 438 of the fluid cylinder is attached to the slide 435 by means of a bracket 440 and a fitting 441.

Each slide 435 is provided with a face plate half insert 442 with the halves combining to define an aperture 443 of a size snugly to receive the mandrel 55. The face plate halves 442 are preferably formed of a plastic material which will not damage the end of the casing strand 83 when compressed thereagainst.

In order to assure that when the slides are in their closed positions the aperture 443 is centered on the mandrel 55, each slide 435, as is best shown in FIG. 4, is provided with an adjustable stop member 444 engageable with the outer end of the respective guide 434.

Inasmuch as the travel of the head 77 is controlled, in order that strands may be compressed to different selected lengths, each support 431 and its brace 433 is mounted on a base 445 which has numerous selected positions on the base 374.

With the head 77 in a downstream position, a casing strand 83 is delivered through the open jaws 394, after which the head 77 returns to its starting position of FIG. 7. The cylinder 411 is then actuated to close the jaws. At this time the stop mechanism 78 has been actuated to move the face halves 442 to their closed position of FIG. 4. The cylinder 385 is now actuated to move the head 77 to the phantom line position of FIG. 3 and the strand disposed between the head 77 and the stop mechanism 78 is compressed to the desired length. During the movement of the head 77 from its retracted position to the strand compressing position, the cylinder 427 is repeatedly actuated to oscillate the rotatable head 393 and thereby refurnish the trailing end of the shirred strand 83.

The stop unit 78 is then opened and the cylinder 387 is actuated further to advance the compressed strand 83 along the mandrel 55 to a position where it is received by the strand handler 57. The strand handler will then, in a manner which in no way forms a part of this invention, move the strand into engagement with the end closer to close the leading end of the strand 83 in the known manner.

After the strand has been doffed, the cylinder 387 is de-energized, permitting the head 77 to move back through the stop unit 78. The stop unit 78 is then returned to its closed position and the strand compresser and doffer 56 is ready to receive the next strand.

What is claimed as new is:

1. In a shirring machine a combined strand compresser and doffer, said shirring machine comprising a fixed mandrel, a stop device and a movable head positioned along said mandrel, said stop device having a longitudinally fixed position relative to said mandrel and having selected open and closed positions wherein a shirred strand is free to pass therethrough along said mandrel to be doffed and wherein a shirred strand is prevented from moving along said mandrel, to be compressed, and positioning means for selectively positioning said movable head relative to said stop device, said positioning means including first means for positioning said movable head remote from said stop device to provide space along said mandrel for a shirred strand, second means for positioning said movable head closer to said stop device and at a selected spacing therefrom for compressing a shirred strand between said stop device and said movable head to a preselected length, and third means for moving said movable head to a position adjacent said stop device for doffing a compressed shirred strand from said mandrel, said positioning means including a first linear motor coupled to said movable head for moving said movable head longitudinally along said mandrel, and a second linear motor coupled to said first linear motor for moving said first linear motor longitudinally relative to said mandrel.

2. A shirring machine according to claim 1 wherein said first and second linear motors combined form said first means, said first linear motor forms said second means, and said second linear motor forms said third means.

3. In a shirring machine a combined strand compresser and doffer, said shirring machine comprising a fixed mandrel, a stop device and a movable head positioned along said mandrel, said stop device having a longitudinally fixed position relative to said mandrel and having selected open and closed positions wherein a shirred strand is free to pass therethrough along said mandrel to be doffed and wherein a shirred strand is prevented from moving along said mandrel, to be compressed, and positioning means for selectively positioning said movable head relative to said stop device, said movable head including a face plate for closely surrounding said mandrel and engaging a trailing end of a shirred strand, said face plate being of a diametrically split construction and includes halves pivotally mounted for movement in the general direction of the length of said mandrel about an axis transverse to said mandrel to an open position spaced radially from said mandrel and where a shirred casing is free to move along said mandrel through said movable head.

4. A shirring machine according to claim 3 wherein there is a single linear motor coupled to said face plate halves for simultaneously moving said face plate halves between an operating position and said closed position and return.

5. A shirring machine according to claim 4 wherein linkage including a longitudinally movable yoke which connects said linear motor to said face plate.

6. In a shirring machine a combined strand compresser and doffer, said shirring machine comprising a fixed mandrel, a stop device and a movable head positioned along said mandrel, said stop device having a longitudinally fixed position relative to said mandrel and having selected open and closed positions wherein a shirred strand is free to pass therethrough along said mandrel to be doffed and wherein a shirred strand is prevented from moving along said mandrel, to be compressed, and positioning means for selectively positioning said movable head relative to said stop device, said movable head including a face plate for closely surrounding said mandrel and engaging a trailing end of a shirred strand, said face plate having a smoothing surface for engaging a trailing end of a shirred casing for smoothing the shirred casing trailing end, and means mounting said face plate for rotational movement about said mandrel.

7. A shirring machine according to claim 6 together with a linear motor actuator connected to said face plate for imparting oscillatory movement to said face plate when engaged with a trailing end of a shirred casing.

8. A shirring machine according to claim 4 wherein said single linear motor extends parallel to said mandrel for movement with said movable head.

9. A shirring machine according to claim 6 wherein said face plate is of a split construction and pivotally mounted for movement to an open position spaced radially from said mandrel where a shirred casing is free to move along said mandrel through said movable head.

10. A shirring machine according to claim 9 wherein there is a single linear motor coupled to said face plate for moving said face plate between an operating position and said closed position and return.

11. A shirring machine according to claim 10 wherein linkage including a longitudinally movable yoke connects said linear motor to said face place.

* * * * *